(12) United States Patent
Rossbach et al.

(10) Patent No.: US 12,267,824 B2
(45) Date of Patent: Apr. 1, 2025

(54) OPTIMIZING OF SCHEDULING

(71) Applicant: APPLE INC., Cupertino, CA (US)

(72) Inventors: Ralf Rossbach, Bavaria-Bayern (DE); Fangli Xu, Beijing (CN); Haijing Hu, Cupertino, CA (US); Lakshmi Iyer, Cupertino, CA (US); Sabine Roessel, Bavaria-Bayern (DE); Sarma V. Vangala, Cupertino, CA (US); Sree Ram Kodali, Cupertino, CA (US); Sudeep Manithara Vamanan, Bavaria-Bayern (DE)

(73) Assignee: APPLE INC., Cupertino, CA (US)

( * ) Notice: Subject to any disclaimer, the term of this patent is extended or adjusted under 35 U.S.C. 154(b) by 442 days.

(21) Appl. No.: 17/593,689

(22) PCT Filed: Feb. 19, 2021

(86) PCT No.: PCT/CN2021/076889
§ 371 (c)(1),
(2) Date: Sep. 22, 2021

(87) PCT Pub. No.: WO2022/151564
PCT Pub. Date: Jul. 21, 2022

(65) Prior Publication Data
US 2023/0180207 A1    Jun. 8, 2023

(30) Foreign Application Priority Data

Jan. 14, 2021    (WO) ................ PCT/CN2021/071863

(51) Int. Cl.
*H04W 72/12* (2023.01)
*H04W 72/20* (2023.01)
*H04W 72/50* (2023.01)

(52) U.S. Cl.
CPC .......... *H04W 72/12* (2013.01); *H04W 72/20* (2023.01); *H04W 72/535* (2023.01)

(58) Field of Classification Search
CPC .... H04W 72/20; H04W 72/535; H04W 72/12
See application file for complete search history.

(56) References Cited

U.S. PATENT DOCUMENTS

| | | | |
|---|---|---|---|
| 2021/0144582 A1* | 5/2021 | Yi | H04W 72/23 |
| 2021/0227452 A1* | 7/2021 | Munz | H04W 76/10 |

(Continued)

FOREIGN PATENT DOCUMENTS

| | | |
|---|---|---|
| CN | 110636547 A | 12/2019 |
| CN | 110809295 A | 2/2020 |
| WO | 2020043315 A1 | 3/2020 |

OTHER PUBLICATIONS

Nokia, Nokia Shanghai Bell,, Qualcomm, Samsung , "Introducing support TSC Deterministic QoS", S2-1902855, SA WG2 Meeting #131, Santa Cruz—Tenerife, Spain, Change Request 23.501 CR1007 rev 2 Current version: 15.4.0, Feb. 25-Mar. 1, 2019, 3 pages.

(Continued)

*Primary Examiner* — Oussama Roudani
(74) *Attorney, Agent, or Firm* — Dorsey & Whitney LLP

(57) ABSTRACT

Provided is a method for a user equipment (UE), comprising: receiving request for scheduling assistance from a base station, wherein the request for scheduling assistance comprises scheduling configuration to be applied to a set of flows of a scheduled terminal on an application layer; informing the scheduled terminal of the scheduling configuration; receiving scheduling assistance information from the scheduled terminal, wherein the scheduling assistance information is generated by the scheduled terminal based on the set of (Continued)

flows of the scheduled terminal on the application layer; and transmitting the scheduling assistance information to the base station.

16 Claims, 9 Drawing Sheets

(56) References Cited

U.S. PATENT DOCUMENTS

| | | | |
|---|---|---|---|
| 2021/0282049 A1* | 9/2021 | Sun | H04M 15/8016 |
| 2021/0368502 A1* | 11/2021 | Zhang | H04W 72/0446 |
| 2023/0199815 A1* | 6/2023 | Falahati | H04W 72/0446 |
| 2023/0262501 A1* | 8/2023 | Rugeland | H04W 76/27 370/252 |
| 2023/0345574 A1* | 10/2023 | Deenoo | H04W 68/02 |
| 2024/0022278 A1* | 1/2024 | Zhou | H04W 52/365 |
| 2024/0107626 A1* | 3/2024 | Pan | H04L 1/1819 |

OTHER PUBLICATIONS

PCT/CN2021/076889, International Search Report and Written Opinion, Oct. 27, 2021, 9 pages.

CMCC, "Enhancement for Time-Sensitive Networking", R2-1815270, 3GPP TSG-RAN WG2 Meeting #103bis, Chengdu, China, Agenda Item 11.7.2, Oct. 8-12, 2018, 10 pages.

CMCC, "Scheduling Enhancements for TSN traffic", R2-1818122, 3GPP TSG-RAN WG2 #104, Spokane, Washington, Agenda Item 11.7.2, Nov. 12-16, 2018, 7 pages.

Huawei, Hisilicon, "Further details of UE assistance information procedure for NR SL", R2-1913703 (Revision of R2-1911166) 3GPP TSG-RAN WG2 #107bis, Chongqing, China, Agenda Item 6.4.6, Oct. 14-18, 2019, 6 pages.

Intel Corporation, "TSC assistance information", R2-1912716 (Revision of R2-1909392), 3GPP TSG-RAN WG2 Meeting #107bis, Chongqing, China, Agenda Item 6.7.2.2.3, Oct. 14-18, 2019, 4 pages.

* cited by examiner

OPTIMIZING OF SCHEDULING

TECHNICAL FIELD

This application relates generally to wireless communication systems, and more specifically to optimizing of scheduling.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (base station), which communicate with a wireless communication device, also known as user equipment (UE).

SUMMARY

According to an aspect of the present disclosure, a method for a user equipment (UE), comprising receiving request for scheduling assistance from a base station, wherein the request for scheduling assistance comprises scheduling configuration to be applied to a set of flows of a scheduled terminal on an application layer; informing the scheduled terminal of the scheduling configuration: receiving scheduling assistance information from the scheduled terminal, wherein the scheduling assistance information is generated by the scheduled terminal based on the set of flows of the scheduled terminal on the application layer; and transmitting the scheduling assistance information to the base station.

According to an aspect of the present disclosure, a method for a UE is provided, comprising: receiving request for scheduling assistance from a base station, wherein the request for scheduling assistance comprises scheduling configuration to be applied to a set of flows of a scheduled terminal on an application layer; generating scheduling assistance information based on the set of flows of the scheduled terminal on the application layer; and transmitting the scheduling assistance information to the base station.

According to an aspect of the present disclosure, a method for a base station is provided, comprising: transmitting request for scheduling assistance to a UE, wherein the request for scheduling assistance comprises scheduling configuration to be applied to a set of flows of a scheduled terminal on an application layer, and receiving the scheduling assistance information from the UE, wherein the scheduling assistance information is generated by the scheduled terminal or the UE based on the set of flows of the scheduled terminal on the application layer.

According to an aspect of the present disclosure, a method for a UE is provided, comprising-receiving request for scheduling assistance from a base station, wherein the request for scheduling assistance comprises scheduling configuration to be applied to a set of flows of a scheduled terminal on an application layer; informing the scheduled terminal of the scheduling configuration: receiving scheduling recommendation information from the base station; and transmitting the scheduling recommendation information to the scheduled terminal.

According to an aspect of the present disclosure, a method for a user equipment (UE) is provided, comprising: receiving request for scheduling assistance from a base station, wherein the request for scheduling assistance comprises scheduling configuration to be applied to a set of flows of a scheduled terminal on an application layer; informing the scheduled terminal of the scheduling configuration; receiving scheduling assistance information from the scheduled terminal, wherein the scheduling assistance information is generated by the scheduled terminal, in response to receiving scheduling indication from another scheduled terminal through the application layer, based on the set of flows of the scheduled terminal on the application layer, transmitting the scheduling assistance information to the base station: receiving scheduling recommendation information from the base station; and transmitting the scheduling recommendation information to the scheduled terminal.

According to an aspect of the present disclosure, an apparatus for a user equipment (UE) is provided, comprising: one or more processors configured to perform steps of the method according to the present disclosure.

According to an aspect of the present disclosure, an apparatus for a base station is provided, comprising: one or more processors configured to perform steps of the method according to the present disclosure.

According to an aspect of the present disclosure, a computer readable medium is provided, the computer readable medium having computer programs stored thereon which, when executed by one or more processors, cause an apparatus to perform steps of the method according to the present disclosure.

According to an aspect of the present disclosure, an apparatus for a communication device is provided, comprising means for performing steps of the method according to the present disclosure.

According to an aspect of the present disclosure, a computer program product is provided, the computer program product comprising computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (base station), which communicate with a wireless communication device, also known as user equipment (UE). Although some examples may be described with reference to any of E-UTRAN Node B, an eNB, an RNC and/or a base station, such devices may be replaced with any type of base station.

For time sensitive communication (TSC), a 5G system (5GS) can be integrated as a bridge in a time-sensitive networking (TSN) network (i.e. a TSN bridge). The device-side TSN translator (DS-TT) is deployed at the UE-side edge and the network-side TSN translator (NW-TT) is deployed at the network-side edge in order to interface with a TSN network while achieving transparency. The DS-TT and NW-TT fulfil all functions related to IEEE 802.1AS, which include delivery of generalized precision time protocol (gPTP) messages. DS-TT and UE can be combined or can be separate.

When the 5G system is integrated with the Time Sensitive Networking (TSN) network, the knowledge of TSN traffic pattern is useful for the base station to allow it to more efficiently schedule periodic, deterministic traffic flows either via Configured Grants, Semi-Persistent Scheduling or with dynamic grants In other non-TSN related use-cases relying heavily on CG/SPS (such as URLLC in general, AR/VR, XR, or Advanced Interactive Services), the scheduling assistance information is also needed to optimize the scheduling of the base station.

Figure 1:
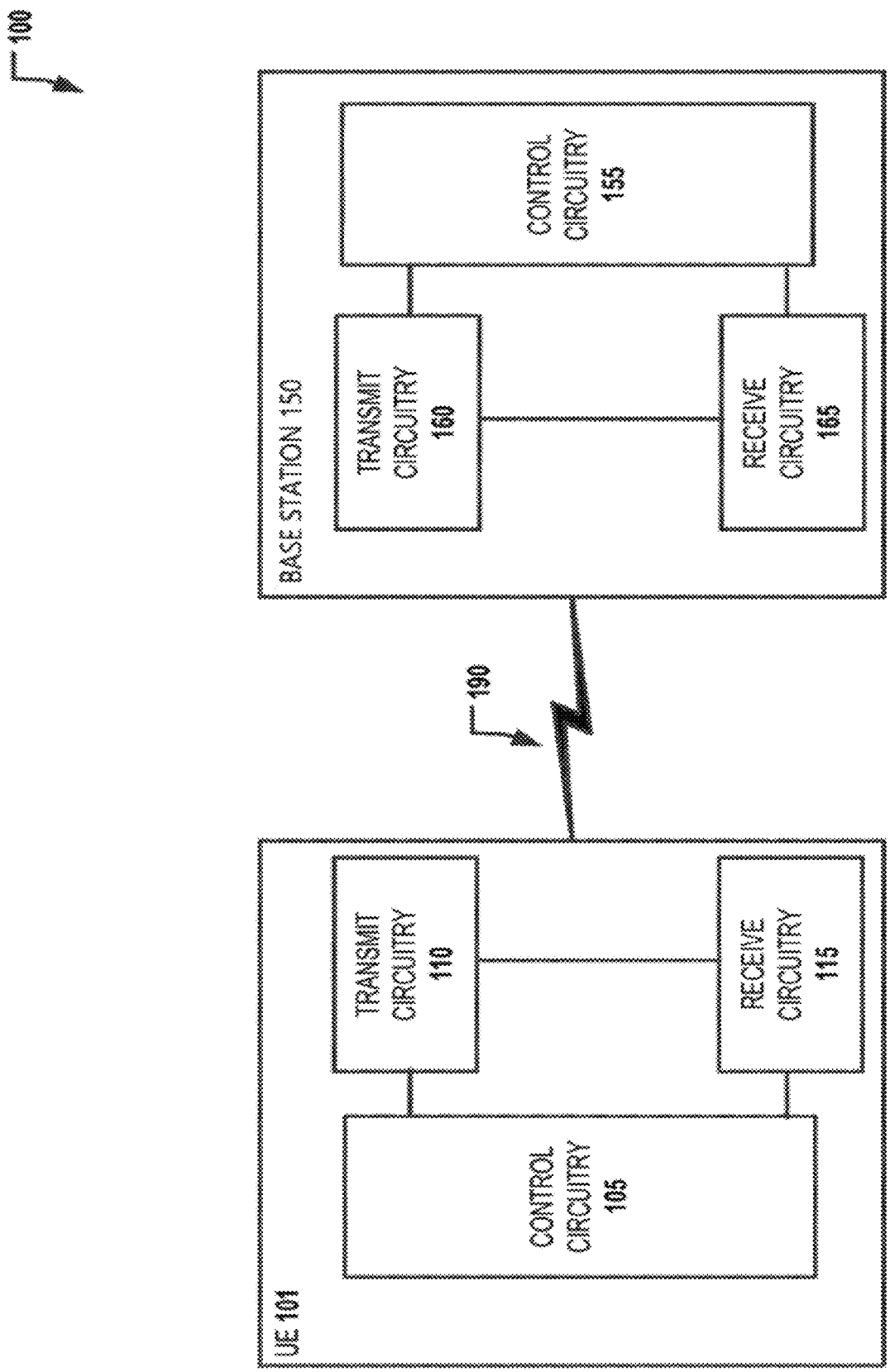
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized de, ices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may, perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry, 110 may transmit a plurality of multiplexed uplink physical channels. The plurality of uplink physical channels may be multiplexed according to time division multiplexing (TDM) or frequency division multiplexing (FDM) The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

Figure 2:
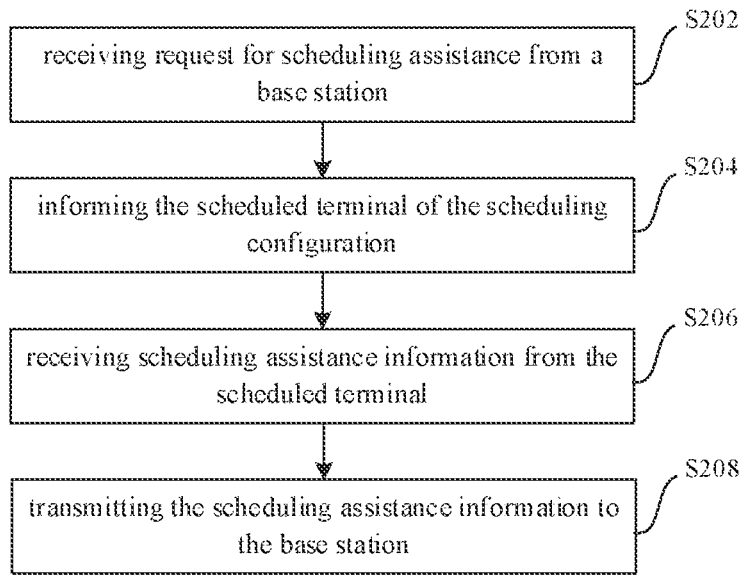
FIG. 2 illustrates a flowchart for an exemplary method for a user device in accordance with some embodiments.

FIG. 2 illustrates a flowchart for an exemplary method 200 for a user device in accordance with some embodiments. The method 200 illustrated in FIG. 2 may be implemented by the UE 101 described in FIG. 1.

The method 200 may, begin at step S202, where the UE receives request for scheduling assistance from a base station, wherein the request for scheduling assistance comprises scheduling configuration to be applied to a set of flows of a scheduled terminal on an application layer.

In some embodiments, through the request for scheduling assistance, the base station configures the UE to provide scheduling assistance. For example, the message layer of scheduling assistance can be configured, on which the information associated with the scheduling assistance is transmitted.

In some embodiments, the reporting of the scheduling assistance information can be configured separately for uplink (UL) and downlink (DL).

In some embodiments, the scheduling configuration in the request for scheduling assistance applies to a set of flows of a scheduled terminal on an application layer (e.g., a set of QoS flows on the application layer).

In some embodiments, the scheduled terminal can be a Device-side Time-Sensitive Networking Translator (DS-TT) or an Application (5G Media Client, XR Application, etc.).

At step S204, the UE informs the scheduled terminal of the scheduling configuration.

At step S206, the UE receives scheduling assistance information from the scheduled terminal, wherein the scheduling assistance information is generated by the scheduled terminal based on the set of flows of the scheduled terminal on the application layer.

In some embodiments, the scheduling assistance information is the traffic pattern information reported by the scheduled terminal based on the scheduling parameters in the scheduling configuration.

In some embodiments, the scheduling assistance information is reported based on the set of the scheduled terminal on the application layer identified by scheduling configuration.

In some embodiments, the scheduling assistance information include at least one of: the expected number of bytes, the periodicity and the burst timing.

At step S208, the UE transmits the scheduling assistance information to the base station.

In some embodiments, the scheduling assistance information can be mapped to different RAN layers. For example, the scheduling assistance information can be mapped to the RRC layer, where the scheduling assistance information corresponds to the RRC UEAssistanceInformation (with extended parameter set); the scheduling assistance information can be mapped to the MAC laver, where the scheduling assistance information corresponds to a new MAC CE; or the scheduling assistance information can be mapped to the SDAP layer, where the scheduling assistance information corresponds to a new SDAP control PDU (with extended parameter set).

Therefore, the present application provides a method that optimizers the scheduling by providing scheduling assistance information, which enables better accuracy of scheduling decisions based on real arrival times at the UE, especially for the uplink (as the base station has more control over queues in DL), power saving and latency benefits.

In some embodiments, the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

In some embodiments, for the recommended periodicity, there may exist a list of periodicities, such as the application layer periodicity, the lower layer periodicity. In some embodiments, when UE only signals one type of periodicity, the UE can apply a factor between the application layer periodicity and the lower layer periodicity (up-convert or down-convert).

In some embodiments, the pattern identity is one of the following three options: QFI (e.g., at RRC, SDAP, MAC), CG (e.g., at RRC or MAC), and DRB/LCH (e.g., at RRC or MAC). The QFI refers QoS-FlowIdentity, which is probably the general (typical) setup, suitable for most cases, and possible to be used both before and after CG/SPS setup, the CG corresponds to configurodGrantConfigIndexMAC, which can be used to request a parameter adjustment for a particular CG, and can be used after CG/SPS setup, e.g., to request a periodicity adjustment for a specific CG; the DRB/LCH corresponds to logicalChannelIdentity, which can be used in case that multiple QFIs are mapped to the same DRB. DRB/LCH is mapped to multiple CGs, and can be used after CG/SPS setup. e.g., to request a burst size adjustment for a specific LCH.

In some embodiments, the link direction can be uplink or downlink.

In some embodiments, the interface characteristic is used to identify the target layer for the message and/or a timestamp base, which can be DS-TT, Application, or lower layer. With respect to burst timing, 'lower layer' translates into radio time.

In some embodiments, the recommended burst parameter includes at least one of: a burst size and a burst timing.

In some embodiments, the burst size refers to the burst Size in bytes (e.g., within the time period indicated by periodicity), and can indicate the min. max, average burst size In case only one value is provided then Maximum Burst Size is preferred.

In some embodiments, the burst timing is for burst arrival, which is chosen for the following three options:
 Burst Start and Burst End time window between first packet and last packet arrival; reported as: a) two values, one for burst start and one for burst end; or b) the sum of start time and maximum duration;
 Burst Arrival Time:
 Burst Arrival Time (BAT) and Burst Spread (based on jitter on application level, e.g. the variation of the arrival time of the first packet).

In some embodiments, the receiving the request for scheduling assistance from the base station, the informing the scheduled terminal of the scheduling configuration, the receiving the scheduling assistance information from the scheduled terminal and the transmitting the scheduling assistance information to the base station are performed through a message layer, and wherein the message layer is different from the application layer.

In some embodiments, the message layer is the MAC layer, the RRC layer or the SDAP layer.

In some embodiments, when the message layer is the MAC layer, the scheduling assistance information corresponds to a new MAC CE.

In some embodiments, when the message layer is the RRC layer, the scheduling assistance information corresponds to the RRC UEAssistanceInformation (with extended parameter set). Two example message layout is shown as follows.

Example 1

```
UEAssistanceInformation ::= SEQUENCE {
    criticalExtensions CHOICE {
        ueAssistanceInformationUEAssistanceInformation-IEs,
        criticalExtensionsFuture SEQUENCE { }
    }
}
...
```

```
UE-ULSchedulingAssistanceInformation-r17 ::= SEQUENCE (SIZE (1..maxNrofTrafficPattern-r17)) OF
TrafficPatternInfo-r17
UE-DLSchedulingAssistanceInformation-r17 ::= SEQUENCE (SIZE (1..maxNrofTrafficPattern-r17)) OF
TrafficPatternInfo-r17
TrafficPatternInfo-r17::= SEQUENCE {
    trafficPeriodicity-r17 ENUMERATED {ms1, ms5, ms10, ms20, ms50, ms100, ms150, ...} OPTIONAL,
    timeBase-r17 ENUMERATED {DSTT, APP, UE, ...} OPTIONAL,
    burstStart-r17 INTEGER (0..10239) OPTIONAL,
    burstEnd-r17 INTEGER (0..10239) OPTIONAL,
    burstSize-r17 BIT STRING (SIZE (8)) OPTIONAL,
    QoS-FlowIdentity-r17 QoS-FlowIdentity-r17 OPTIONAL
}
```

Example 2

```
UEAssistanceInformation ::= SEQUENCE {
   criticalExtensions CHOICE {
       ueAssistanceInformation UEAssistanceInformation-IEs,
       criticalExtensionsFuture SEQUENCE { }
   }
}
...
UE-ULSchedulingAssistanceInformation-r17 ::= SEQUENCE (SIZE (1..maxNrofTrafficPattern-r17)) OF
TrafficPatternInfo-r17
UE-DLSchedulingAssistanceInformation-r17 ::= SEQUENCE (SIZE (1..maxNrofTrafficPattern-r17)) OF
TrafficPatternInfo-r17
TrafficPatternInfo-r17::= SEQUENCE {
   trafficPeriodicity-r17 ENUMERATED {ms1, ms5, ms10, ms20, ms50, ms100, ms150, ...}   OPTIONAL
   timeBase-r17 ENUMERATED {DSTT, APP, UE}   OPTIONAL,
   burstStart-r17 INTEGER (0..10239)   OPTIONAL,
   burstEnd-r17 INTEGER (0..10239)   OPTIONAL,
   burstSize-r17 BIT STRING (SIZE (8))   OPTIONAL,
   pattenId-r17 CHOICE {
   QoS-FlowIdentity QoS-FlowIdentity,
   logicalChannelIdentity logicalChannelIdentity,
   configuredGrantConfigIndexMAC ConfiguredGrantConfigIndexMAC
   }   OPTIONAL
}
```

The example configuration of UL/DL scheduling assistance for CG and SPS is as follows:

```
OtherConfig ::= SEQUENCE {
     delayBudgetReportingConfig CHOICE{
     release NULL,
     setup SEQUENCE{
     delayBudgetReportingProhibitTimer ENUMERATED {s0, s0dot4, s0dot8, s1dot6, s3, s6, s12, s30}
     }
   } OPTIONAL --
Need M
}
OtherConfig-v1540 ::= SEQUENCE {
     overheatingAssistanceConfig SetupRelease {OverheatingAssistanceConfig}   OPTIONAL, -- Need M
...
}
CandidateServingFreqListNR-r16 ::= SEQUENCE (SIZE (1..maxFreqIDC-r16)) OF ARFCN-ValueNR
OtherConfig-v1610 ::= SEQUENCE {
     idc-AssistanceConfig-r16 SetupRelease {IDC-AssistanceConfig-r16} OPTIONAL, -- Need M
     drx-PreferenceConfig-r16 SetupRelease {DRX-PreferenceConfig-r16} OPTIONAL, -- Need M
     maxBW-PreferenceConfig-r16 SetupRelease {MaxBW-PreferenceConfig-r16} OPTIONAL, --Need M
     maxCC-PreferenceConfig-r16 SetupRelease {MaxCC-PreferenceConfig-r16} OPTIONAL, -- Need M
     maxMIMO-LayerPreferenceConfig-r16      SetupRelease      {MaxMIMO-LayerPreferenceConfig-r16}
OPTIONAL, -- Need M
     minSchedulingOffsetPreferenceConfig-r16   SetupRelease   {MinSchedulingOffsetPreferenceConfig-r16}
OPTIONAL, -- Need M
     releasePreferenceConfig-r16 SetupRelease {ReleasePreferenceConfig-r16} OPTIONAL, -- Need M
     referenceTimePreferenceReporting-r16 ENUMERATED {true} OPTIONAL, -- Need R
     btNateList-r16 SetupRelease (BT-NameList-r16} OPTIONAL, -- Need M
     wlanNameList-r16 SetupRelease (WLAN-NameList-r16) OPTIONAL, -- Need M
     sensorNameList-r16 SetupRelease (Sensor-NameList-r16} OPTIONAL, -- Need M
     obtainCommonLocation-r16 ENUMERATED {true} OPTIONAL, -- Need R
```

```
   sl-AssistanceConfigNR-r16 ENUMERATED {true} OPTIONAL, -- Need R}
OtherConfig-v1710 ::= SEQUENCE {
   ul-schedulingAssistanceConfig-r17    ENUMERATED {true}   OPTIONAL, -- Need R
   dl-schedulingAssistanceConfig-r17    ENUMERATED {true}   OPTIONAL -- Need R
}
```

In some embodiments, when the message layer is the SDAP layer, the scheduling assistance information corresponds to a new SDAP control PDU (with extended parameter set).

Figure 3:
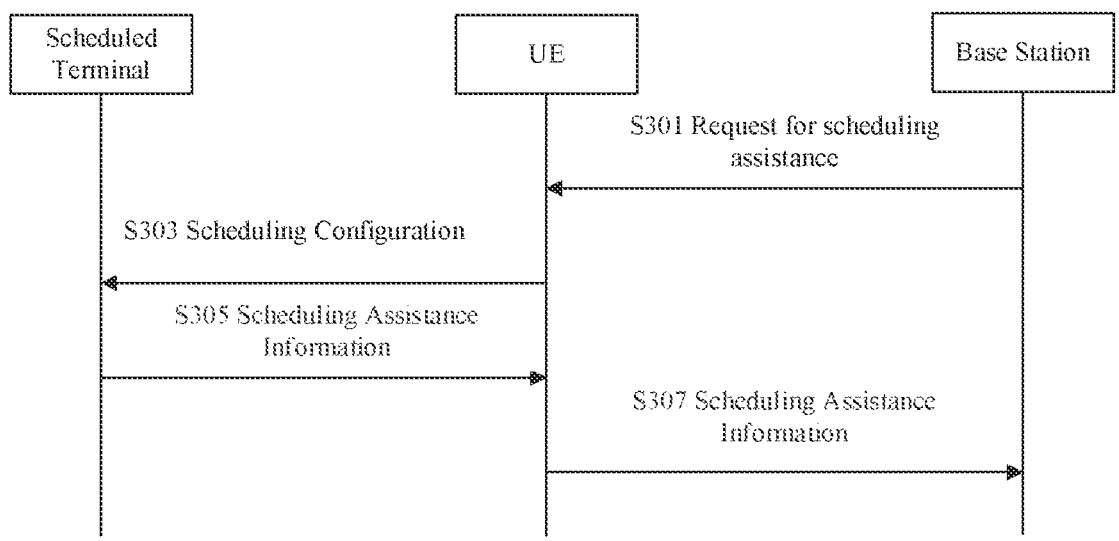
FIG. 3 illustrates a procedure for scheduling assistance between a UE and a base station in accordance with some embodiments.

FIG. 3 illustrates a procedure 300 for scheduling assistance between a UE and a base station in accordance with some embodiments.

In some embodiments, the scheduled terminal is a DS-TT, and the base station is a gNB. In other embodiments, the scheduled terminal is an Application (5G Media Client, XR Application, etc.), the UE is a UE modem (5G AS), and the base station is gNB.

At S301, the base station sends the request for scheduling assistance to a UE, wherein the request for scheduling assistance includes scheduling configuration applying to a set of flows of a scheduled terminal on an application layer. Specifically. Network configures the UE to provide scheduling assistance, and decides on a message layer. Reporting can be configured separately for UL and DL. Scheduling configuration applies to a set of QoS flows.

At S303, the UE applies the scheduling configuration and informs the scheduled terminal of the scheduling configuration.

At S305, the scheduled terminal applies the scheduling configuration and reports the requested scheduling assistance information to the UE. The scheduling assistance information is generated by the scheduled terminal based on the set of the scheduled terminal on the application layer. For example, the scheduling assistance information may include the expected number of bytes, the periodicity, the burst timing, etc.

At S307, the UE reports scheduling assistance information to the base station.

In some embodiments, the scheduling assistance information can be mapped to different RAN layers, for example: the RRC UEAssistanceInformation (with extended parameter set); the new MAC CE; and the new SDAP control PDU (with extended parameter set).

In some embodiments, the scheduling assistance information is generated by the scheduled terminal in response to receiving the scheduling adjustment information from a core network through the application layer.

Figure 4:
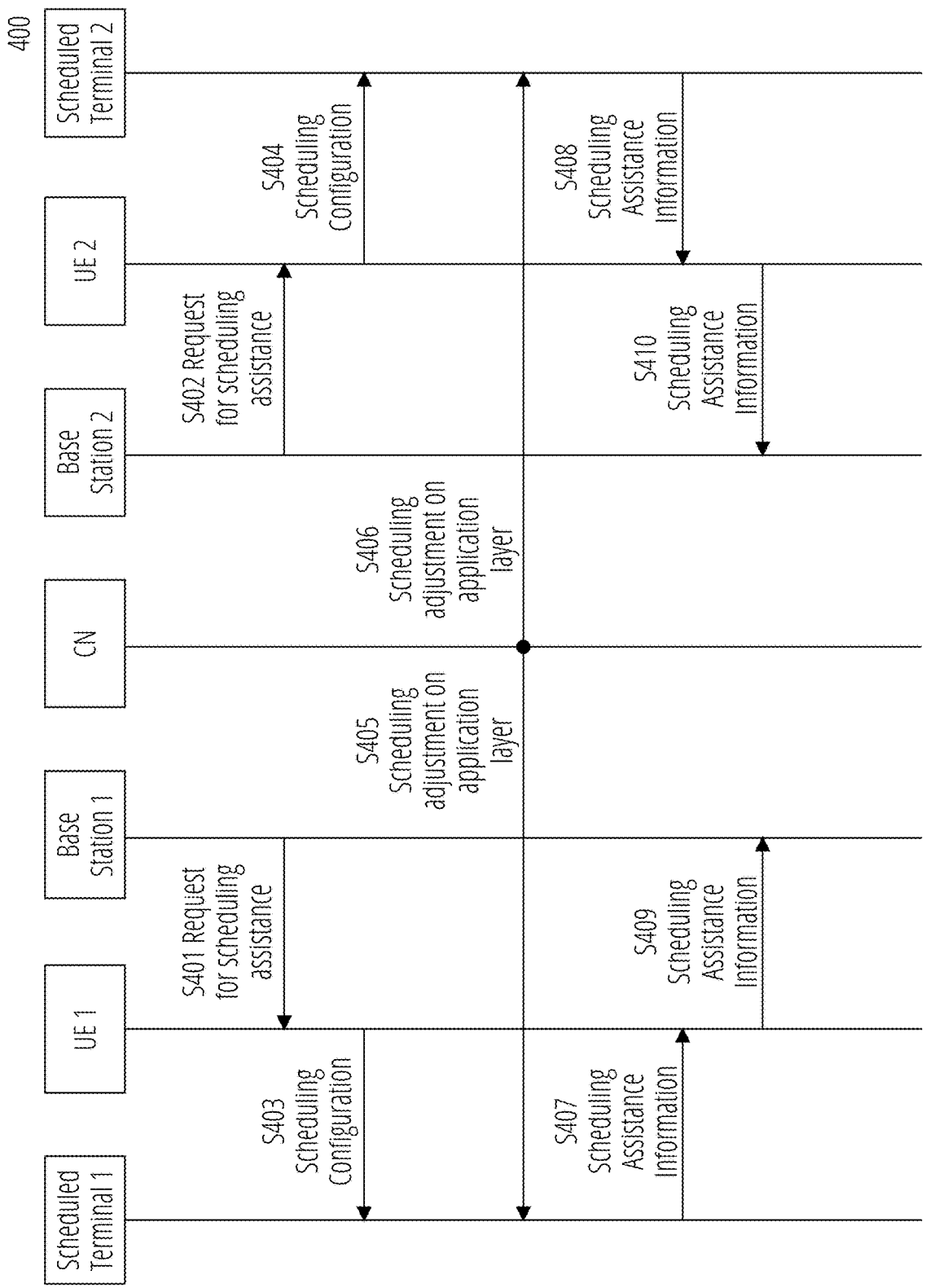
FIG. 4 illustrates a procedure for scheduling assistance of End-to-end in accordance with some embodiments.

FIG. 4 illustrates a procedure 400 for scheduling assistance of End-to-end in accordance with some embodiments. As shown in FIG. 4, the End-to end interaction refers to the interaction between two scheduled terminals (i.e., the Scheduled Terminal 1 and the Scheduled Terminal 2), wherein the Scheduled Terminal 1 and the Scheduled Terminal 2 are two DS-TTs, or two Applications.

In some embodiments, the two scheduled terminals communicate with each other on the application layer through the UEs and the base stations on both sides and the Core Network (CN). In some embodiments, the CN in FIG. 4 can be the 5G Application Function (5G AF) in the CN.

At Step 401, the Base Station 1 sends the request for scheduling assistance to UE 1. In some embodiments, Step 401 can be performed similar to Step 301 in FIG. 3.

At Step 402, the Base Station 2 sends the request for scheduling assistance to UE 2. In some embodiments, Step 402 can be performed similar to Step 301 in FIG. 3.

In some embodiments, Steps 401 and 402 can be performed at the same time. In some embodiments, Steps 401 and 402 can be performed at different time, e.g., Step 401 can be performed before Step 402.

At Step 403, the UE 1 applies the scheduling configuration and informs the Scheduled Terminal 1 of the scheduling configuration In some embodiments. Step 403 can be performed similar to Step 303 in FIG. 3.

At Step 404, the UE 2 applies the scheduling configuration and informs the Scheduled Terminal 2 of the scheduling configuration. In some embodiments, Step 404 can be performed similar to Step 303 in FIG. 3.

In some embodiments. Steps 403 and 404 can be performed at the same time. In some embodiments, Steps 403 and 404 can be performed at different time. e.g., Step 403 can be performed before Step 404.

At Step 405, the CN transmits scheduling adjustment information to the Scheduled Terminal 1 on the application layer.

At Step 406, the CN transmits scheduling adjustment information to the Scheduled Terminal 2 on the application layer.

In some embodiments, Steps 405 and 406 can be performed at the same time. In some embodiments, Steps 405 and 406 can be performed at different time, e.g., Step 405 can be performed before Step 406.

At Step 407, the Scheduled Terminal 1 applies the scheduling configuration and reports the requested scheduling assistance information to the UE 1. The scheduling assistance information is generated by the Scheduled Terminal 1 in response to receiving the scheduling adjustment information from the CN through the application layer.

In some embodiments, the scheduling assistance information can be an Access Network Scheduling Recommendation Query (ANSRQ), which carries a scheduling hint that the base station can use as assistance information from the UE. The ANSRQ can be conveyed as a MAC CE from the UE to the base station. The network can configure a prohibit timer to prevent UEs from sending frequent query messages.

At Step 408, the Scheduled Terminal 2 applies the scheduling configuration and reports the requested scheduling assistance information to the UE 2. The scheduling assistance information is generated by the Scheduled Terminal 2 in response to receiving the scheduling adjustment information from the CN through the application layer. In some embodiments, as described above with reference to Schedule Terminal 1, the scheduling assistance information can be ANSRQ.

In some embodiments. Steps 407 and 408 can be performed at the same time. In some embodiments, Steps 407 and 408 can be performed at different time, e.g., Step 407 can be performed before Step 408.

At Step 409, the UE 1 reports the scheduling assistance information received from the Scheduled Terminal 1 to the Base Station 1.

At Step 410, the UE 2 reports the scheduling assistance information received from the Scheduled Terminal 2 to the Base Station 2.

In some embodiments, Steps 409 and 410 can be performed at the same time. In some embodiments. Steps 409 and 410 can be performed at different time, e.g., Step 409 can be performed before Step 410.

Figure 5:
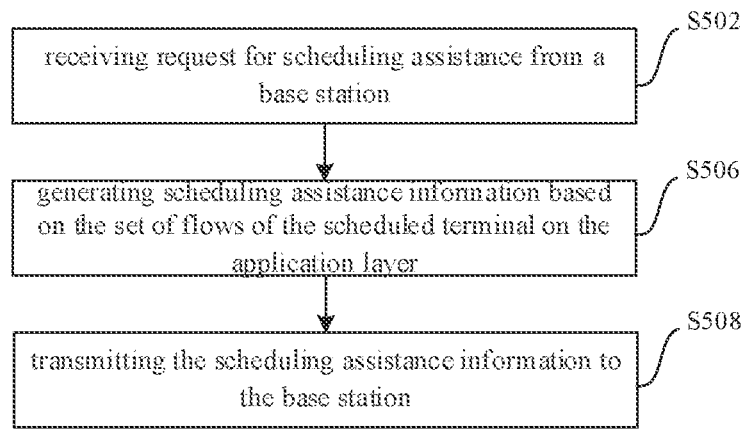
FIG. 5 illustrates a flowchart for an exemplary method for a user device in accordance with some embodiments.

FIG. 5 illustrates a flowchart for an exemplary method 500 for a user device in accordance with some embodiments. The method 500 illustrated in FIG. 5 may be implemented by the UE 101 described in FIG. 1.

The method 500 may begin at step S502, where the UE receives request for scheduling assistance from a base station, wherein the request for scheduling assistance comprises scheduling configuration to be applied to a set of flows of a scheduled terminal on an application layer In some embodiments, Step 502 can be performed similar to Step 202 in FIG. 2.

At step S506, the UE generates scheduling assistance information based on the set of flows of the scheduled terminal on the application layer.

In some embodiments, normal data transfer occurs between the scheduled terminal and the UE, and the UE filters the set of flows of the scheduled terminal on the application layer and generates the scheduling assistance information accordingly. In some embodiments, the scheduling assistance information include at least one of: the expected number of bytes, the periodicity and the burst timing.

At Step 508, the UE transmits the scheduling assistance information to the base station. In some embodiments, Step 508 can be performed similar to Step 208 in FIG. 2.

In some embodiments, the scheduling assistance information can be mapped to different RAN layers. For example, the scheduling assistance information can be mapped to the RRC layer, where the scheduling assistance information corresponds to the RRC UEAssistanceInformation (with extended parameter set); the scheduling assistance information can be mapped to the MAC layer, where the scheduling assistance information corresponds to a new MAC CE; or the scheduling assistance information can be mapped to the SDAP layer, where the scheduling assistance information corresponds to a new SDAP control PDU (with extended parameter set).

The method 500 is less accurate than method 200. Burst parameters and periodicity of the data arrival at the UE may be subject to internal interface constraints between the scheduled terminal and UE. For example, application data may be distributed over multiple smaller packets and received at a slightly different rate by the UE.

SDAP is suited for method 500, as it has a notion of the QFI. Other layers would have to parse(extract) external traffic flows, which is slightly more cumbersome (can be more expensive).

Figure 6:
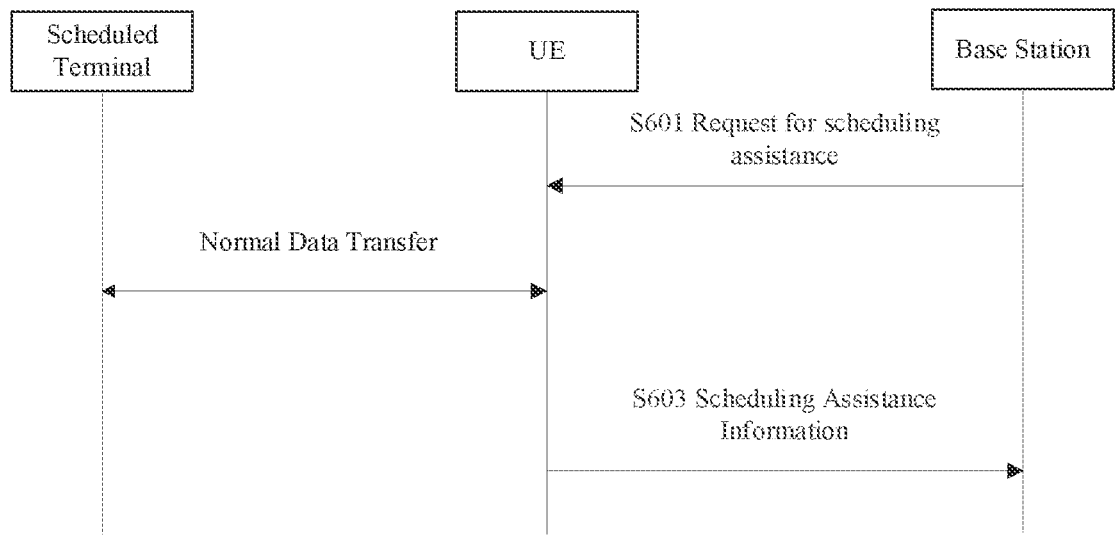
FIG. 6 illustrates a procedure for scheduling assistance between a UE and a base station in accordance with some embodiments.

FIG. 6 illustrates a procedure 600 for scheduling assistance between a UE and a base station in accordance with some embodiments.

In some embodiments, the scheduled terminal is a DS-TT, and the base station is a gNB. In other embodiments, the scheduled terminal is an Application (5G Media Client. XR Application, etc.), the UE is a UE modem(5G AS), and the base station is gNB.

At S601, the base station sends the request for scheduling assistance to a UE, wherein the request for scheduling assistance includes scheduling configuration applying to a set of flows of a scheduled terminal on an application layer. Specifically, Network configures the UE to provide scheduling assistance, and decides on a message layer. Reporting can be configured separately for UL and DL. Scheduling configuration applies to a set of QoS flows.

In some embodiments, after receiving the request for scheduling assistance from the base station, the UE applies the configuration and generates the scheduling assistance information. Specifically, normal data transfer occurs between the scheduled terminal and the UE, and the UE filters relevant flows (e.g. QoS flows), records and collects relevant traffic patterns (e.g., expected number of bytes, periodicity, burst timing, etc.).

At S603, the UE reports scheduling assistance information to the base station. In some embodiments, the scheduling assistance information can be mapped to different RAN layers, for example: the RRC UEAssistanceInformation (with extended parameter set); the new MAC CE; and the new SDAP control PDU (with extended parameter set).

In some embodiments, the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

In some embodiments, the recommended burst parameter includes at least one of: a burst size and a burst timing.

In some embodiments, the receiving the request for scheduling assistance from the base station and the transmitting the scheduling assistance information to the base station are performed through a message layer, and wherein the message layer is different from the application layer.

In some embodiments, the message layer is MAC layer. RRC layer or SDAP layer.

Figure 7:
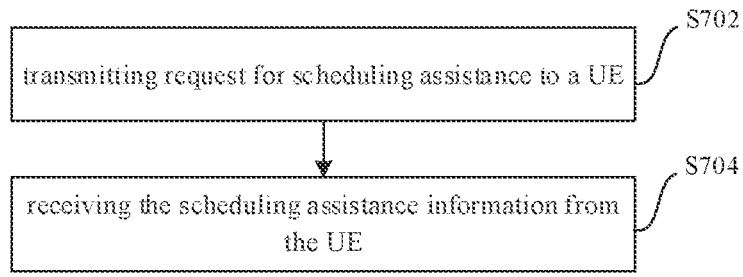
FIG. 7 illustrates a flowchart for an exemplary method for a base station in accordance with some embodiments.

FIG. 7 illustrates a flowchart 700 for an exemplary method for a base station in accordance with some embodiments. The method 700 illustrated in FIG. 7 may be implemented by the base station 150 described in FIG. 1.

In step 702, the base station transmits request for scheduling assistance to a UE, wherein the request for scheduling assistance comprises scheduling configuration to be applied to a set of flows of a scheduled terminal on an application layer.

In some embodiments, through the request for scheduling assistance, the base station configures the UE to provide scheduling assistance. For example, the message layer of scheduling assistance can be configured, on which the information associated with the scheduling assistance is transmitted.

In some embodiments, the reporting of the scheduling assistance information can be configured separately for uplink (UL) and downlink (DL). In some embodiments, the scheduling configuration in the request for scheduling assistance applies to a set of flows of a scheduled terminal on an application layer (e.g., a set of QoS flows on the application layer).

In some embodiments, the scheduled terminal can be a Device-side Time-Sensitive Networking Translator (DS-TT) or an Application (5G Media Client, XR Application, etc.).

In step S704, the base station receives the scheduling assistance information from the UE, wherein the scheduling assistance information is generated by the scheduled terminal or the UE based on the set of flows of the scheduled terminal on the application layer.

In some embodiments, as described with reference to FIG. 2, the UE receives the scheduling assistance information generated by the scheduled terminal, and transmits the scheduling assistance information to the base station.

In some embodiments, as described with reference to FIG. 5, the UE generates the scheduling information itself, and transmits the scheduling assistance information to the base station.

In some embodiments, the base station can optimize the scheduling based on the scheduling assistance information from the UE.

In some embodiments, the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

In some embodiments, the burst parameter includes at least one of: a burst size and a burst timing.

In some embodiments, the transmitting the request for scheduling assistance to the UE and the receiving the scheduling assistance information from the UE are performed through a message layer, and wherein the message layer is different from the application layer.

In some embodiments, the message layer is the MAC layer, the RRC layer or the SDAP layer.

Figure 8:
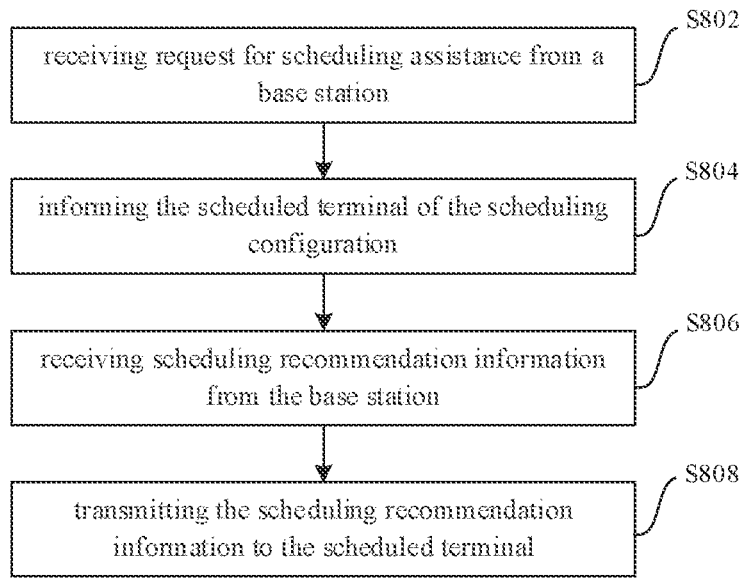
FIG. 8 illustrates a flowchart for an exemplary method for a user device in accordance with some embodiments.

FIG. 8 illustrates a flowchart for an exemplary method for a user device in accordance with some embodiments. The method 800 illustrated in FIG. 8 may be implemented by the UE 101 described in FIG. 1.

The method 801) may begin at step S802, where the UE receives request for scheduling assistance from a base station, wherein the request for scheduling assistance includes scheduling configuration applying to a set of flows of a scheduled terminal on an application layer In some embodiments, step S802 can be performed similar to step 202 in FIG. 2.

At step S804, the UE applies the scheduling configuration and informs the scheduled terminal of the scheduling configuration. In some embodiments, step S804 can be performed similar to step S204 in FIG. 2.

At step S806, the UE receives scheduling recommendation information from the base station, wherein the scheduling recommendation is generated by the base station in response to detecting change of traffic situation.

In some embodiments, the base station generates the scheduling recommendation information in response to detecting significant change of periodicity, burst size, or arrival times in e.g. DL (SPS).

In some embodiments, the scheduling recommendation information refers to access network scheduling recommendation (ANSR), which provides a means for the base station to indicate a scheduling indication to assist the scheduled terminal (e.g., the UE Applications or the DS-TT), e.g., to adapt burst rates ANSR can result in a set of parameters being exposed to the application Based on the recommended scheduling parameters, a UE may trigger end-to-end signaling with a peer UE or an application server. e.g., to update arrival times or to provide a hint on scheduling related parameters for bursty data traffic. The UE may use ANSR in combination with other scheduling information.

At step S808, the UE transmits the scheduling recommendation information to the scheduled terminal.

In some embodiments, in response to receiving the scheduling recommendation information, the scheduled terminal transmits an end-to-end signaling to another scheduled terminal communicating with it.

In some embodiments, the scheduled terminal is a Device-side Time-Sensitive Networking Translator (DS-TT) or an application terminal, and the scheduling assistance information includes at least one of: a recommended periodicity, a pattern identity, a link direction, a interface and a recommended burst parameter.

In some embodiments, the recommended burst parameter includes at least one of: a burst size and a burst timing.

In some embodiments, the UE receives the request for scheduling assistance from the base station, informs the scheduled terminal of the scheduling configuration, receives the scheduling recommendation information from the base station through a message layer, and transmits the scheduling recommendation information to the scheduled terminal, wherein the message layer is different from the application layer.

In some embodiments, the message layer is the MAC layer, the RRC layer or the SDAP layer.

Figure 9:
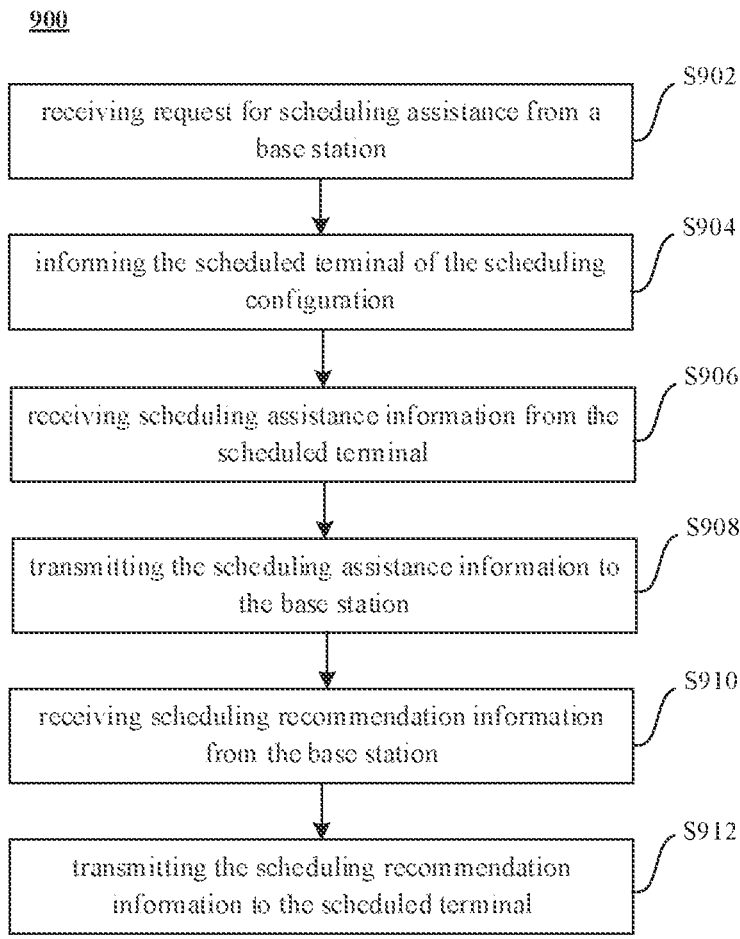
FIG. 9 illustrates a flowchart for an exemplary method for a user device in accordance with some embodiments.

FIG. 9 illustrates a flowchart for an exemplary method for a user device in accordance with some embodiments. The method 900 illustrated in FIG. 9 may be implemented by the UE 101 described in FIG. 1.

The method 900 may begin at step S902, where the UE receives request for scheduling assistance from a base station, wherein the request for scheduling assistance comprises scheduling configuration to be applied to a set of flows of a scheduled terminal on an application layer. In some embodiments, step S902 can be performed similar to step 202 in FIG. 2.

At step S904, the UE informs the scheduled terminal of the scheduling configuration. In some embodiments, step S904 can be performed similar to step S204 in FIG. 2.

At step S906, the UE receives scheduling assistance information from the scheduled terminal, wherein the scheduling assistance information is generated by the scheduled terminal, in response to receiving scheduling indication from another scheduled terminal through the application layer, based on the set of the scheduled terminal on the application layer.

In some embodiments, the scheduling assistance information is generated by the scheduled terminal in response to receiving scheduling indication from another scheduled terminal through the application layer. For example, the another scheduled terminal transmits the scheduling indication to the scheduled terminal in response to being adjusted by another base station at the side of the another scheduled terminal, such as being described with reference to method 800.

In some embodiments, the scheduling assistance information refers to access network scheduling recommendation query (ANSRQ). The ANSRQ carries a scheduling hint that the base station can use as assistance information from the UE (e.g., in case TSCAI is not available).

At step S908, the UE transmits the scheduling assistance information to the base station.

In some embodiments, the UE sends the ANSRQ to its local base station to check if a scheduling recommendation provided by its peer can be followed, for example, the scheduling recommendation corresponds to the scheduling indication from another scheduled terminal.

At step S910, the UE receives scheduling recommendation information from the base station, wherein the scheduling recommendation is generated by the base station in response to detecting change of traffic situation.

In some embodiments, the base station generates the scheduling recommendation information in response to detecting significant change of periodicity, burst size, or arrival times in e.g. DL (SPS).

In some embodiments, the scheduling recommendation information refers to access network scheduling recommendation (ANSR), which provides a means for the base station to indicate a scheduling indication to assist the scheduled terminal (e.g., the UE Applications or the DS-TT), e.g., to adapt burst rates. ANSR can result in a set of parameters being exposed to the application. The UE may use ANSR in combination with other scheduling information.

At step S912, the UE transmits the scheduling recommendation information to the scheduled terminal.

In some embodiments, in response to receiving the scheduling recommendation information, the scheduled terminal transmits an end-to-end signaling to the another scheduled terminal, e.g. ACK for new rate.

In some embodiments, the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

In some embodiments, the recommended burst parameter includes at least one of: a burst size and a burst timing.

In some embodiments, the receiving request for scheduling assistance from a base station, the informing the scheduled terminal of the scheduling configuration, the receiving scheduling assistance information from the scheduled terminal, the transmitting the scheduling assistance information to the base station, the receiving scheduling recommendation information from the base station, and transmitting the scheduling recommendation information to the scheduled terminal are performed through a message layer, and wherein the message layer is different from the application layer.

In some embodiments, the message layer is the MAC layer, the RRC layer or the SDAP layer.

Figure 10:
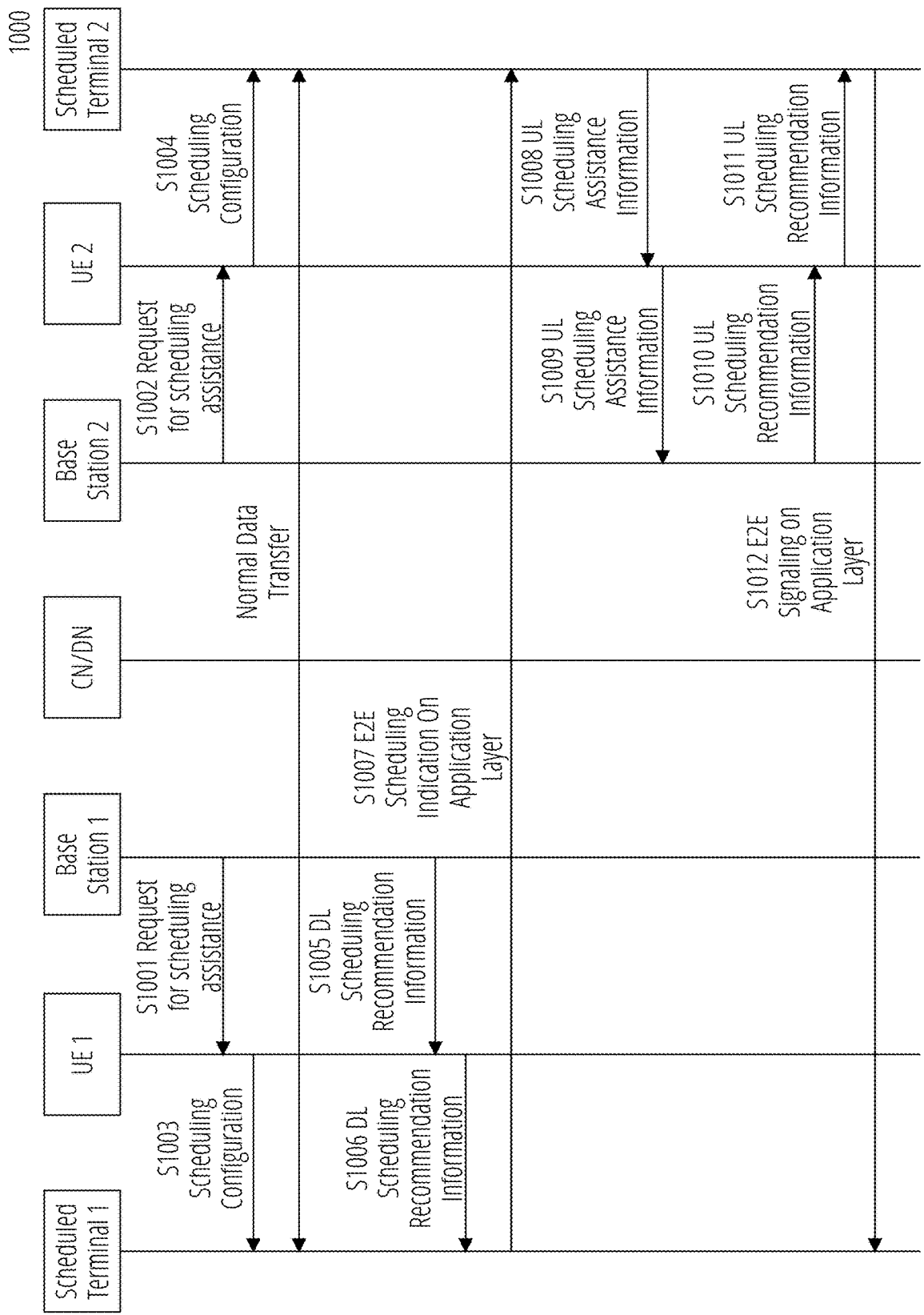
FIG. 10 illustrates a procedure for scheduling assistance of End-to-end in accordance with some embodiments.

FIG. 10 illustrates a procedure 1000 for scheduling assistance of End-to-end (E2E) in accordance with some embodiments.

At Step 1001, the Base Station 1 sends the request for scheduling assistance to UE1. In some embodiments. Step 1001 can be performed similar to Step 301 in FIG. 3.

At Step 1102, the Base Station 2 sends the request for scheduling assistance to UE2. In some embodiments. Step 1002 can be performed similar to Step 301 in FIG. 3.

In some embodiments, Steps 1001 and 1002 can be performed at the same time. In some embodiments. Steps 1001 and 1002 can be performed at different time, e.g., Step 1001 can be performed before Step 1002.

At Step 1003, the UE 1 applies the scheduling configuration and informs the Scheduled Terminal 1 of the scheduling configuration. In some embodiments, Step 403 can be performed similar to Step 303 in FIG. 3.

At Step 1004, the UE 2 applies the scheduling configuration and informs the Scheduled Terminal 2 of the scheduling configuration. In some embodiments. Step 404 can be performed similar to Step 303 in FIG. 3.

In some embodiments, Steps 1003 and 1004 can be performed at the same time In some embodiments, Steps 1003 and 1004 can be performed at different time, e.g., Step 1003 can be performed before Step 1004.

In some embodiments, normal data transfer occurs between the Schedule Terminal 1 and the Scheduled Terminal 2 through the application layer.

At step S1005, the Base station 1 transmits the DL scheduling recommendation information to UE 1, wherein the Base station 1 generates the DL scheduling recommendation information in response to detecting significant change of traffic situation, for example, periodicity, burst size, or arrival times in e.g. DL (SPS).

In some embodiments, the DL scheduling recommendation information can be the ANSR sent by the Base Station 1 to indicate a scheduling indication assist the Scheduled Terminal 1 to the change of the traffic situation.

At step S1006, the UE 1 transmits the DL scheduling recommendation information to the Scheduled Terminal 1.

At step S1007, the Scheduled Terminal 1 sends the E2E scheduling indication to the Scheduled Terminal 2 on the application layer. In some embodiments, the Scheduled Terminal 1 sends the E2E scheduling indication to inform the Scheduled Terminal 2 of the scheduling change in the Scheduled Terminal 1.

At step S1008, the Scheduled Terminal 2 transmits the UL scheduling assistance information to the UE 2, wherein the UL scheduling assistance information is generated by the Scheduled Terminal 2 in response to receiving the E2E scheduling indication from the Scheduled Terminal 1.

In some embodiments, the UL scheduling assistance information can be the ANSRQ, which carries a scheduling hint that the Base Station 2 can use as assistance information.

At step S1009, the UE 2 transmits the UL scheduling assistance information to the Base Station 2.

At step S1010, the Base Station 2 transmits the UL scheduling recommendation information to the UE 2. In some embodiments, the UL scheduling assistance information can be the ANSR.

At step S1011, the UE 2 transmits the UL scheduling recommendation information to the Scheduled Terminal 2.

At step S1012, the Scheduled Terminal 2 applies the UL scheduling recommendation information, and transmits the E2E signaling on the application layer to the Scheduled Terminal 1 (e.g., ACK for new rate).

As described above, when the method in the present disclosure applies to the E2E solution, it can optimize scheduling not only for the local UE but for a remote UE as well.

The embodiments of the present disclosure provide an apparatus for a user equipment (UE), the apparatus comprising: one or more processors configured to perform steps of the method according to the present disclosure.

The embodiments of the present disclosure provide an apparatus for a base station, the apparatus comprising: one or more processors configured to perform steps of the method according to the present disclosure.

The embodiments of the present disclosure provide a computer readable medium having computer programs stored thereon which, when executed by one or more processors, cause an apparatus to perform steps of the method according to the present disclosure.

The embodiments of the present disclosure provide an apparatus for a communication device, comprising means for performing steps of the method according to the present disclosure.

The embodiments of the present disclosure provide an apparatus for a computer program product comprising computer programs which, when executed by one or more processors, cause an apparatus to perform steps of the method according to the present disclosure.

Figure 11:
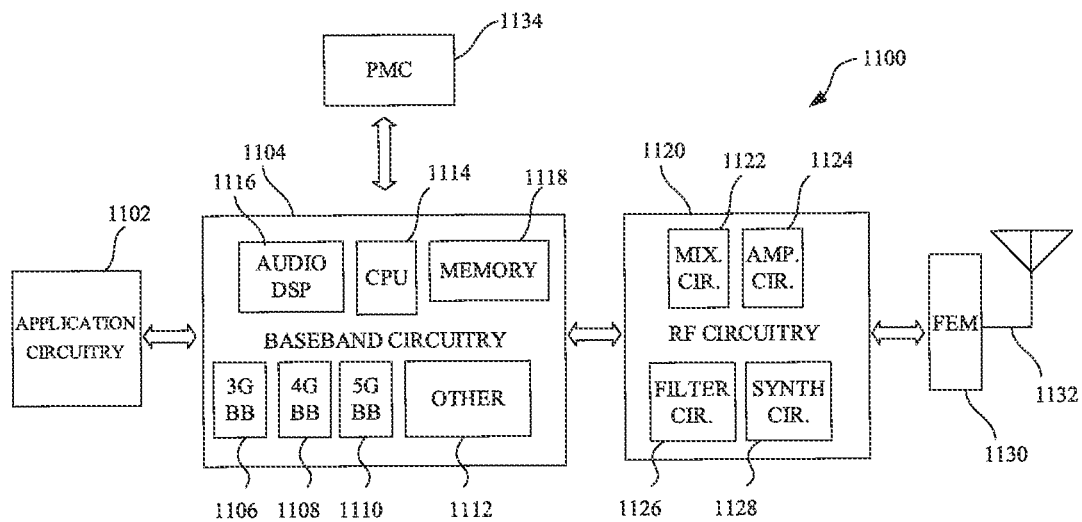
FIG. 11 illustrates a communication device (e.g. a UE or a base station) in accordance with some embodiments.

FIG. 11 illustrates example components of a device 1100 in accordance with some embodiments. In some embodiments, the device 1100 may include application circuitry 1102, baseband circuitry 1104. Radio Frequency (RF) circuitry (shown as RF circuitry 1120), front-end module (FEM) circuitry (shown as FEM circuitry 1130), one or more antennas 1132, and power management circuitry (PMC) (shown as PMC 1134) coupled together at least as shown.

The components of the illustrated device 1100 may be included in a UE or a RAN node. In some embodiments, the device 1100 may include fewer elements (e.g., a RAN node may, not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1120 and to generate baseband signals for a transmit signal path of the RF circuitry 1120. The baseband circuitry 1104 may interface with the application circuitry 1102 for generation and processing of the baseband signals and for controlling operations of the RF circuitry 1120. For example, in some embodiments, the baseband circuitry 1104 may include a third generation (3G) baseband processor (3G baseband processor 1106), a fourth generation (4G) baseband processor (4G baseband processor 1108), a fifth generation (5G) baseband processor (5G baseband processor 1110), or other baseband processor(s) 1112 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1120. In other embodiments, some or all of the functionality of the illustrated baseband processors may be included in modules stored in the memory 118 and executed via a Central Processing ETnit (CPET 1114). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi. or Low Density Parity Check (LDPC) encoder/decoder functionality Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1116. The one or more audio DSP(s) 1116 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1120 may enable communication with wireless networks using modulated electromagnetic radiation through a non-solid medium In various embodiments, the RF circuitry 1120 may include switches, filters, amplifiers, etc. to facilitate the communication with the wireless network. The RF circuitry 1120 may include a receive signal path which may include circuitry to down-convert RF signals received from the FEM circuitry 1130 and provide baseband signals to the baseband circuitry 1104. The RF circuitry 1120 may, also include a transmit signal path which may include circuitry to up-convert baseband signals provided by the baseband circuitry 1104 and provide RF output signals to the FEM circuitry 1130 for transmission.

In some embodiments, the receive signal path of the RF circuitry 1120 may include mixer circuitry 1122, amplifier circuitry 1124 and filter circuitry 1126. In some embodiments, the transmit signal path of the RF circuitry 1120 may include filter circuitry 1126 and mixer circuitry 1122. The RF circuitry 1120 may also include synthesizer circuitry 1128 for synthesizing a frequency for use by the mixer circuitry, 1122 of the receive signal path and the transmit signal path. In some embodiments, the mixer circuitry 1122 of the receive signal path may be configured to down-convert RF signals received from the FEM circuitry 1130 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 104 for further processing In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry, 1122 of the transmit signal path may be configured to up-convert input baseband signals based on the synthesized frequency provided by the synthesizer circuitry 1128 to generate RF output signals for the FEM circuitry 1130. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1120 may include analog-to-digital converter (ADC) and digital-to-analog converter (DAC) circuitry and the baseband circuitry 1104 may include a digital baseband interface to communicate with the RF circuitry 1120.

In some dual-mode embodiments, a separate radio IC circuitry may be provided for processing signals for each spectrum, although the scope of the embodiments is not limited in this respect.

In some embodiments, the synthesizer circuitry 1128 may be a fractional –N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1120 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 (such as an applications processor) depending on the desired output frequency. In some embodiments, a divider control input (e.g., N) may be determined from a look-up table based on a channel indicated by the application circuitry 1102.

Synthesizer circuitry 1128 of the RF circuitry 1120 may include a divider, a delay-locked loop (DLL) a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1120 may include an IQ/polar converter.

The FEM circuitry 1130 may include a receive signal path which may include circuitry configured to operate on RF signals received from one or more antennas 1132, amplify the received signals and provide the amplified versions of the received signals to the RF circuitry 1120 for further processing. The FEM circuitry 1130 may also include a transmit signal path which may include circuitry configured to amplify signals for transmission provided by the RF circuitry 1120 for transmission by one or more of the one or more antennas 1132. In various embodiments, the amplification through the transmit or receive signal paths may be done solely in the RF circuitry 1120, solely in the FEM circuitry 1130, or in both the RF circuitry 1120 and the FEM circuitry 1130.

In some embodiments, the FEM circuitry 1130 may include a TX/RX switch to switch between transmit mode and receive mode operation. The FEM circuitry 1130 may include a receive signal path and a transmit signal path. The receive signal path of the FEM circuitry 1130 may include an LNA to amplify received RF signals and provide the amplified received RF signals as an output (e.g., to the RF circuitry 1120). The transmit signal path of the FEM circuitry 1130 may include a power amplifier (PA) to amplify input RF signals (e.g., provided by the RF circuitry 1120), and one or more filters to generate RF signals for subsequent transmission (e.g., by one or more of the one or more antennas 1132).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a EGE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1102, the RF circuitry 1120, or the FEM circuitry 1130.

In some embodiments, the PMC 1134 may control, or otherwise be part of, various power saving mechanisms of the device 1100. For example, if the device 1100 is in an RRC Connected state, where it is still connected to the RAN node as it expects to receive traffic shortly, then it may enter a state known as Discontinuous Reception Mode (DRX) after a period of inactivity. During this state, the dev ice 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1102 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
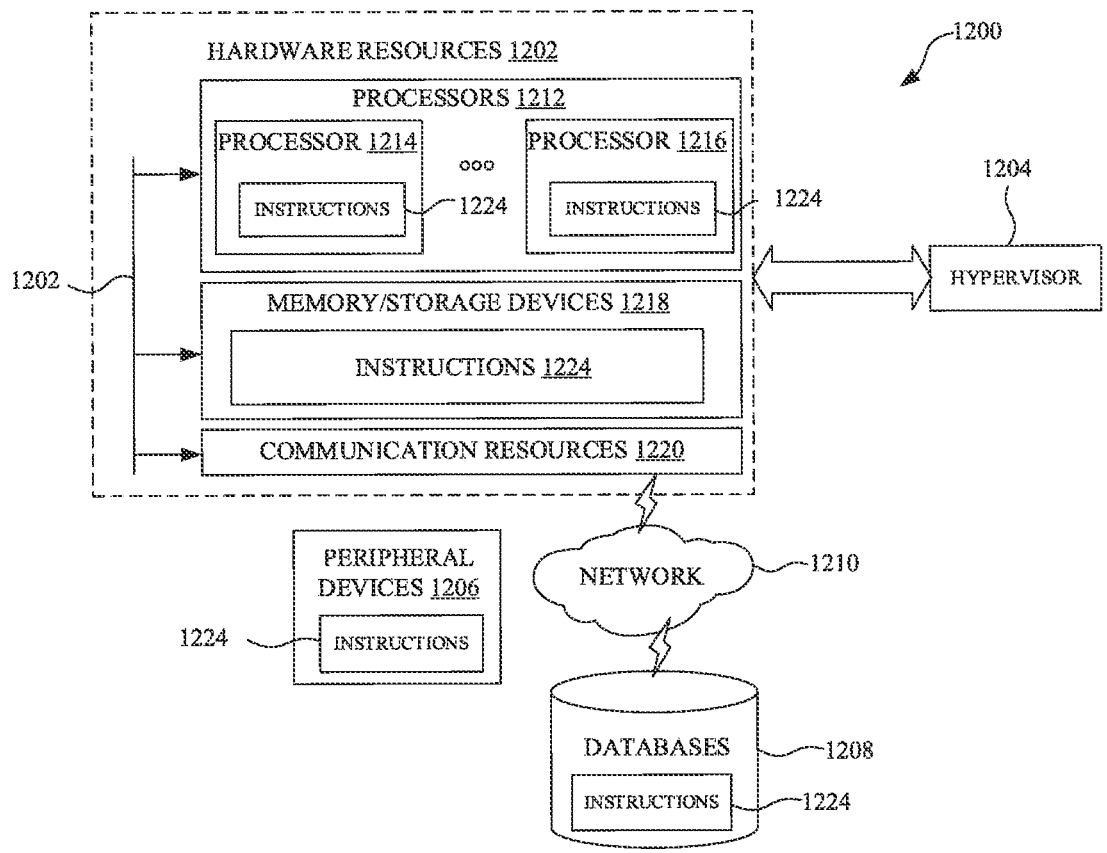
FIG. 12 illustrates components in accordance with some embodiments.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically. FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 1220 may include interconnection or network interface components or other suitable devices to communicate with one or more peripheral devices 1206 or one or more databases 1208 via a network 1212. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi®, components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 13:
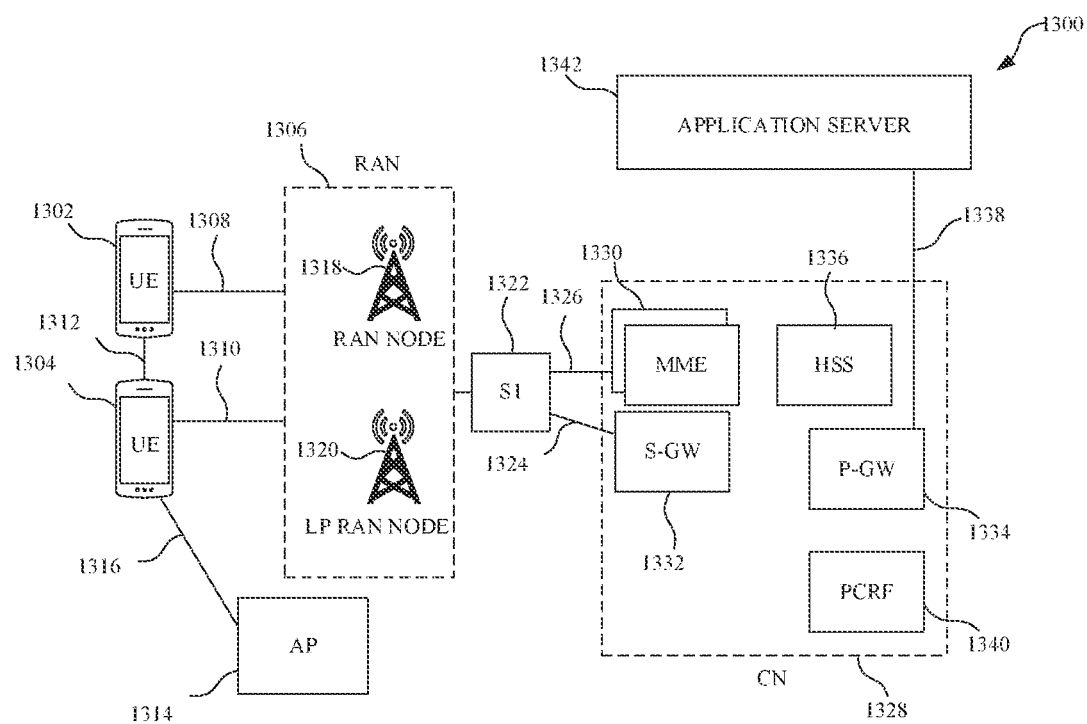
FIG. 13 illustrates an architecture of a wireless network in accordance with some embodiments.

FIG. 13 illustrates an architecture of a system 1300 of a network in accordance with some embodiments. The system 1300 includes one or more user equipment (UE), shown in this example as a UE 1302 and a UE 1304. The UE 13u2 and the UE 13134 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1302 and the UE 1104 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1302 and the UE 1304 may be configured to connect, e.g., communicatively couple, with a radio access network (RAN), shown as RAN 1306. The RAN 1306 may be, for example, an Evolved ETniversal Mobile Telecommunications System (ETMTS) Terrestrial Radio Access Network (E-UTRAN), a NextGen RAN (NG RAN), or some other type of RAN. The UE 1302 and the UE 1304 utilize connection 1308 and connection 1310, respectively, each of which comprises a physical communications interface or layer (discussed in further detail below); in this example, the connection 1308 and the connection 1310 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UNITS) protocol, a 3GPP Long Term Evolution (LTE) protocol, a fifth generation (5G) protocol, a New Radio (NR) protocol, and the like.

In this embodiment, the UE 1302 and the UE 1304 may further directly exchange communication data via a ProSe interface 1312. The ProSe interface 1312 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1304 is shown to be configured to access an access point (AP), shown as AP 1134, via connection 1316. The connection 1316 can comprise a local wireless connection, such as a connection consistent with any IEEE 802.13 protocol, wherein the AP 1314 would comprise a wireless fidelity (WiFi®) router. In this example, the AP 1314 may be connected to the Internet without connecting to the core network of the wireless system (described in further detail below).

The RAN 1306 can include one or more access nodes that enable the connection 1308 and the connection 1310. These access nodes (ANs) can be referred to as base stations (BSs), NodeBs, evolved NodeBs (eNBs), next Generation NodeBs (base station), RAN nodes, and so forth, and can comprise ground stations (e.g., terrestrial access points) or satellite stations providing coverage within a geographic area (e.g., a cell). The RAN 1306 may include one or more RAN nodes for providing macrocells, e.g., macro RAN node 1318, and one or more RAN nodes for providing femtocells or picocells (e.g., cells having smaller coverage areas, smaller user capacity, or higher bandwidth compared to macrocells), e.g., a low power (LP) RAN node such as LP RAN node 1320.

Any of the macro RAN node 1318 and the LP RAN node 1320 can terminate the air interface protocol and can be the First point of contact for the UE 1302 and the UE 1304. In some embodiments, any of the macro RAN node 1318 and the LP RAN node 1320 can fulfill various logical functions for the RAN 1306 including, but not limited to, radio network controller (RNC) functions such as radio bearer management, uplink and downlink dynamic radio resource management and data packet scheduling, and mobility management.

In accordance with some embodiments, the EGE 13302 and the EGE 1304 can be configured to communicate using Orthogonal Frequency-Division Multiplexing (OFDM) communication signals with each other or with any, of the macro RAN node 1318 and the LP RAN node 1320 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1318 and the LP RAN node 1320 to the UE 1302 and the UE 1304, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1302 and the UE 1304. The physical downlink control channel (PDCCH) may carry information about the transport format and resource allocations related to the PDSCH channel, among other things. It may also inform the UE 1302 and the UE 1304 about the transport format, resource allocation, and H-ARQ (Hybrid Automatic Repeat Request) information related to the uplink shared channel. Typically, downlink scheduling (assigning control and shared channel resource blocks to the UE 1304 within a cell) may be performed at any of the macro RAN node 1318 and the LP RAN node 1320 based on channel quality information fed back from any of the UE 1302 and UE 1304. The downlink resource assignment information may be sent on the PDCCH used for (e.g., assigned to) each of the UE 1302 and the UE 1304.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1306 is communicatively coupled to a core network (CN), shown as CN 1328—via an Sl interface 1322. In embodiments, the CN 1328 may be an evolved packet core (EPC) network, a NextGen Packet Core (NPC) network, or some other type of CN. In this embodiment the Sl interface 1322 is split into two parts the Sl-U interface 1324, which carries traffic data between the macro RAN node 1318 and the LP RAN node 1320 and a serving gateway (S-GW), shown as S-GW 1132, and an Sl-mobility management entity (MME) interface, shown as Sl-MME interface 1326, which is a signaling interface between the macro RAN node 1318 and LP RAN node 1320 and the MME(s) 1330.

In this embodiment, the CN 1328 comprises the MME(s) 1330, the S-GW 1332, a Packet Data Network (PDN) Gateway (P-GW) (shown as P-GW 1334), and a home subscriber server (HSS) (shown as HSS 1336). The MME(s) 1330 may be similar in function to the control plane of legacy Serving General Packet Radio Service (GPRS) Support Nodes (SGSN). The MME(s) 1330 may manage mobility aspects in access such as gateway selection and tracking area list management. The HSS 1336 may comprise a database for network users, including subscription-related information to support the network entities' handling of communication sessions. The CN 1328 may comprise one or several HSS 1336, depending on the number of mobile subscribers, on the capacity of the equipment, on the organization of the network, etc. For example, the HSS 1336 can provide support for routing/roaming, authentication, authorization, naming/addressing resolution, location dependencies, etc.

The S-GW 1332 may terminate the Sl interface 322 towards the RAN 1306, and routes data packets between the RAN 1306 and the CN 1328. In addition, the S-GW 1332 may be a local mobility anchor point for inter-RAN node handovers and also may provide an anchor for inter-3 GPP mobility. Other responsibilities may include lawful intercept, charging, and some policy enforcement.

The P-GW 1334 may terminate an SGi interface toward a PDN. The P-GW 1334 may route data packets between the CN 1328 (e.g., an EPC network) and external networks such as a network including the application server 1342 (alternatively referred to as application function (AF)) via an Internet Protocol (IP) interface (shown as IP communications interface 1338). Generally, an application server 1342 may be an element offering applications that use IP bearer resources with the core network (e.g., ETMTS Packet Services (PS) domain, LTE PS data services, etc.). In this embodiment, the P-GW 1334 is shown to be communicatively coupled to an application server 1142 via an IP communications interface 1338. The application server 1342 can also be configured to support one or more communication services (e.g., Voice-over-Internet Protocol (VoIP) sessions. PTT sessions, group communication sessions, social networking services, etc.) for the UE 1302 and the UE 1304 via the CN 1328.

The P-GW 1334 may further be a node for policy enforcement and charging data collection. A Policy and Charging Enforcement Function (PCRF) (shown as PCRF 1340) is the policy and charging control element of the CN 1328. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1340 may be communicatively coupled to the application server 1342 via the P-GW 1334. The application server 1342 may signal the PCRF 1340 to indicate a new service flow and select the appropriate Quality of Service (QoS) and charging parameters. The PCRF 1340 may provision this rule into a Policy and Charging Enforcement Function (PCEF) (not shown) with the appropriate traffic flow template (TFT) and QoS class of identifier (QCI), which commences the QoS and charging as specified by the application server 1342.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: receiving request for scheduling assistance from a base station, wherein the request for scheduling assistance comprises scheduling configuration to be applied to a set of flows of a scheduled terminal on an application layer; informing the scheduled terminal of the scheduling configuration: receiving scheduling assistance information from the scheduled terminal, wherein the scheduling assistance information is generated by the scheduled terminal based on the set of flows of the scheduled terminal on the application layer; and transmitting the scheduling assistance information to the base station.

Example 2 is the method of Example 1, wherein the scheduled terminal is a Device-side Time-Sensitive Networking Translator (DS-TT) or an application terminal, and the scheduling assistance information includes at least one of a recommended periodicity, a pattern identity, a link direction, an interface characteristic and a recommended burst parameter.

Example 3 is the method of Example 2, wherein the recommended burst parameter includes at least one of: a burst size and a burst timing.

Example 4 is the method of any of Examples 1-3, wherein the receiving the request for scheduling assistance from the base station, the informing the scheduled terminal of the scheduling configuration, the receiving the scheduling assistance information from the scheduled terminal and the transmitting the scheduling assistance information to the base station are performed through a message layer, and wherein the message layer is different from the application layer.

Example 5 is the method of Example 4, wherein the message layer is MAC layer. RRC layer or SDAP layer.

Example 6 is the method of any of Examples 1-3, wherein the scheduling assistance information is generated by the scheduled terminal in response to receiving the scheduling adjustment information from a core network through the application layer.

Example 7 is a method for a user equipment (UE), comprising receiving request for scheduling assistance from a base station, wherein the request for scheduling assistance comprises scheduling configuration to be applied to a set of flows of a scheduled terminal on an application layer; generating scheduling assistance information based on the set of flows of the scheduled terminal on the application layer; and transmitting the scheduling assistance information to the base station.

Example 8 is the method of Example 7, wherein the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

Example 9 is the method of Example 8, wherein the recommended burst parameter includes at least one of: a burst size and a burst timing.

Example 10 is the method of any of Examples 7-9, wherein the receiving request for scheduling assistance from a base station and the transmitting the scheduling assistance information to the base station are performed through a message layer, and wherein the message layer is different from the application layer.

Example 11 is the method of Example 10, wherein the message layer is MAC layer, RRC layer or SDAP layer.

Example 12 is a method for a base station, comprising: transmitting request for scheduling assistance to a UE, wherein the request for scheduling assistance comprises scheduling configuration to be applied to a set of flows of a scheduled terminal on an application layer, and receiving the scheduling assistance information from the UE, wherein the scheduling assistance information is generated by the scheduled terminal or the UE based on the set of flows of the scheduled terminal on the application layer.

Example 13 is the method of Example 12, wherein the scheduled terminal is a Device-side Time-Sensitive Networking Translator (DS-TT) or an application terminal, and the scheduling assistance information includes at least one of a recommended periodicity, a pattern identity, a link direction, an interface characteristic and a recommended burst parameter.

Example 14 is the method of Example 13, wherein the recommended burst parameter includes at least one of a burst size and a burst timing.

Example 15 is the method of any of Examples 12-14, wherein the transmitting request for scheduling assistance to a UE and receiving the scheduling assistance information from the UE are performed through a message layer, and wherein the message layer is different from the application layer.

Example 16 is the method of Example 15, wherein the message layer is MAC layer, RRC layer or SDAP layer.

Example 17 is the method for a user equipment (UE), comprising: receiving request for scheduling assistance from a base station, wherein the request for scheduling assistance comprises scheduling configuration to be applied to a set of flows of a scheduled terminal on an application layer; informing the scheduled terminal of the scheduling configuration; receiving scheduling recommendation information from the base station; and transmitting the scheduling recommendation information to the scheduled terminal.

Example 18 is the method of Example 17, wherein the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

Example 19 is the method of Example 18, wherein the recommended burst parameter includes at least one of a burst size and a burst timing.

Example 20 is the method of any of Examples 17-19, wherein the receiving request for scheduling assistance from a base station, the informing the scheduled terminal of the scheduling configuration, the receiving scheduling recommendation information from the base station and the transmitting the scheduling recommendation information to the scheduled terminal are performed through a message layer, and wherein the message layer is different from the application layer.

Example 21 is the method of Example 20, wherein the message layer is MAC layer. RRC layer or SDAP layer.

Example 22 is a method for a user equipment (UE), comprising: receiving request for scheduling assistance from a base station, wherein the request for scheduling assistance comprises scheduling configuration to be applied to a set of flows of a scheduled terminal on an application layer; informing the scheduled terminal of the scheduling configuration: receiving scheduling assistance information from the scheduled terminal, wherein the scheduling assistance information is generated by the scheduled terminal, in response to receiving scheduling indication from another scheduled terminal through the application layer, based on the set of flows of the scheduled terminal on the application layer; transmitting the scheduling assistance information to the base station: receiving scheduling recommendation information from the base station; and transmitting the scheduling recommendation information to the scheduled terminal.

Example 23 is the method of Example 22, wherein the scheduled terminal is a Device-side Time-Sensitive Networking Translator (DS-TT) or an application terminal, and the scheduling assistance information includes at least one of: a recommended periodicity, a pattern identity, a link direction, an interface characteristic and a recommended burst parameter.

Example 24 is the method of Example 23, wherein the recommended burst parameter includes at least one of a burst size and a burst timing.

Example 25 is the method of any of Examples 22-24, wherein the receiving request for scheduling assistance from a base station, the informing the scheduled terminal of the scheduling configuration, the receiving scheduling assistance information from the scheduled terminal, the transmitting the scheduling assistance information to the base station, the receiving scheduling recommendation information from the base station, and transmitting the scheduling recommendation information to the scheduled terminal are performed through a message layer, and wherein the message layer is different from the application layer.

Example 26 is the method of Example 25, wherein the message layer is MAC layer, RRC layer or SDAP layer.

Example 27 is an apparatus for a user equipment (UE), the apparatus comprising: one or more processors configured to perform steps of the method according to any of Examples 1-11 and 17-26.

Example 28 is an apparatus for a base station, the apparatus comprising: one or more processors configured to perform steps of the method according to any of Examples 12-16.

Example 29 is a computer readable medium having computer programs stored thereon which, when executed by one or more processors, cause an apparatus to perform steps of the method according to any of Examples 1-26.

Example 30 is an apparatus for a communication device, comprising means for performing steps of the method according to any of Examples 1-26.

Example 31 is a computer program product comprising computer programs which, when executed by one or more processors, cause an apparatus to perform steps of the method according to any of Examples 1-26.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways In addition, it is contemplated that parameters/attributes, aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
receiving a request for scheduling assistance from a base station, wherein the request for scheduling assistance comprises a scheduling configuration to be applied to a set of Quality of Service (QOS) flows of a scheduled terminal on an application layer;
informing the scheduled terminal of the scheduling configuration;
receiving scheduling assistance information from the scheduled terminal, wherein the scheduling assistance information is generated by the scheduled terminal based on the set of Qos flows of the scheduled terminal on the application layer, wherein the scheduling assistance information from the scheduled terminal includes a pattern identity, wherein the pattern identity comprises a QoS-FlowIdentity that identifies a first QoS flow of the QoS flows for which the scheduling assistance information applies; and
transmitting the scheduling assistance information including the QoS-FlowIdentity from the scheduled terminal to the base station via a UEAssistanceInformation radio resource control (RRC) message, wherein the scheduling assistance information is included in a traffic information element of the UEAssistanceInformation RRC message, wherein the traffic information element includes burst timing for the first QoS flow from the scheduled terminal.

2. The method of claim 1, wherein the scheduled terminal is a Device-side Time-Sensitive Networking Translator (DS-TT) or an application terminal, and the scheduling assistance information further includes at least one of: a recommended periodicity, a link direction, an interface characteristic and a recommended burst parameter.

3. The method of claim 2, wherein the recommended burst parameter includes at least one of: a burst size and the burst timing.

4. The method of claim 1, wherein the receiving the request for scheduling assistance from the base station, the informing the scheduled terminal of the scheduling configuration, the receiving the scheduling assistance information from the scheduled terminal and the transmitting the scheduling assistance information to the base station are performed through a message layer, and wherein the message layer is different from the application layer.

5. The method of claim 4, wherein the message layer is MAC layer, RRC layer or SDAP layer.

6. The method of claim 1, wherein the scheduling assistance information is generated by the scheduled terminal in response to receiving the scheduling assistance information from a core network through the application layer.

7. A method for a user equipment (UE), comprising:
receiving a request for scheduling assistance from a base station, wherein the request for scheduling assistance comprises scheduling configuration to be applied to a set of Quality of Service (QOS) flows of a scheduled terminal on an application layer;
generating scheduling assistance information based on the set of QoS flows of the scheduled terminal on the application layer, wherein the scheduling assistance information includes a pattern identity, wherein the pattern identity comprises a QoS-FlowIdentity that identifies a first QoS flow of the QoS flows for which the scheduling assistance information applies; and
transmitting the scheduling assistance information including the QoS-FlowIdentity to the base station via a UEAssistanceInformation radio resource control (RRC) message, wherein the scheduling assistance information is included in a traffic information element of the UEAssistanceInformation RRC message, wherein the traffic information element includes burst timing for the first QoS flow from the scheduled terminal.

8. The method of claim 7, wherein the scheduled terminal is a Device-side Time-Sensitive Networking Translator (DS-TT) or an application terminal, and the scheduling assistance information further includes at least one of: a recommended periodicity, a link direction, an interface characteristic and a recommended burst parameter.

9. The method of claim 8, wherein the recommended burst parameter includes at least one of: a burst size and the burst timing.

10. The method of claim 7, wherein the receiving request for scheduling assistance from the base station and the transmitting the scheduling assistance information to the base station are performed through a message layer, and wherein the message layer is different from the application layer.

11. The method of claim 10, wherein the message layer is MAC layer, RRC layer or SDAP layer.

12. A method for a base station, comprising:
transmitting a request for scheduling assistance to a UE, wherein the request for scheduling assistance comprises scheduling configuration to be applied to a set of Quality of Service (Qos) flows of a scheduled terminal on an application layer; and
receiving the scheduling assistance information from the UE, wherein the scheduling assistance information is generated by the scheduled terminal or the UE based on the set of QoS flows of the scheduled terminal on the application layer, wherein the scheduling assistance information from the scheduled terminal includes a pattern identity,
wherein the pattern identity comprises a QoS-FlowIdentity that identifies a first QoS flow of the QoS flows for which the scheduling assistance information applies,
wherein the scheduling assistance information is received via a UEAssistanceInformation radio resource control (RRC) message, wherein the scheduling assistance information is included in a traffic information element of the UEAssistanceInformation RRC message, wherein the traffic information element includes burst timing from the scheduled terminal.

13. The method of claim 12, wherein the scheduled terminal is a Device-side Time-Sensitive Networking Translator (DS-TT) or an application terminal, and the scheduling assistance information further includes at least one of: a recommended periodicity, a link direction, an interface characteristic and a recommended burst parameter.

14. The method of claim 13, wherein the recommended burst parameter includes at least one of: a burst size and the burst timing.

15. The method of claim 12, wherein the transmitting request for scheduling assistance to a UE and receiving the scheduling assistance information from the UE are performed through a message layer, and wherein the message layer is different from the application layer.

16. The method of claim 15, wherein the message layer is MAC layer, RRC layer or SDAP layer.

* * * * *